United States Patent
Dinan

(10) Patent No.: US 10,536,904 B2
(45) Date of Patent: Jan. 14, 2020

(54) PARALLEL TRANSMISSION IN A WIRELESS DEVICE AND WIRELESS NETWORK

(71) Applicant: Ofinno Technologies, LLC, Herndon, VA (US)

(72) Inventor: Esmael Hejazi Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 15/590,982

(22) Filed: May 9, 2017

(65) Prior Publication Data

US 2017/0325175 A1    Nov. 9, 2017

Related U.S. Application Data

(60) Provisional application No. 62/333,789, filed on May 9, 2016.

(51) Int. Cl.
| | | |
|---|---|---|
| *H04W 52/14* | (2009.01) | |
| *H04W 52/26* | (2009.01) | |
| *H04W 52/34* | (2009.01) | |
| *H04L 5/00* | (2006.01) | |
| *H04L 1/00* | (2006.01) | |
| *H04L 27/26* | (2006.01) | |

(52) U.S. Cl.
CPC ......... *H04W 52/146* (2013.01); *H04L 5/0053* (2013.01); *H04L 5/0098* (2013.01); *H04W 52/265* (2013.01); *H04W 52/34* (2013.01); *H04L 1/0003* (2013.01); *H04L 1/0009* (2013.01); *H04L 5/001* (2013.01); *H04L 27/2601* (2013.01)

(58) Field of Classification Search
CPC . H04W 52/146; H04W 52/34; H04W 52/265; H04L 1/0003; H04L 1/0009; H04L 27/2601
See application file for complete search history.

(56) References Cited

U.S. PATENT DOCUMENTS

| | | | |
|---|---|---|---|
| 2011/0268028 A1* | 11/2011 | Stern-Berkowitz | ......................... H04L 5/0048 370/328 |
| 2013/0114505 A1* | 5/2013 | Haim | ................... H04W 52/146 370/328 |
| 2013/0176953 A1* | 7/2013 | Stern-Berkowitz | ......................... H04W 52/146 370/329 |

(Continued)

OTHER PUBLICATIONS

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13), pp. 1-87.

(Continued)

*Primary Examiner* — Steven H Nguyen
(74) *Attorney, Agent, or Firm* — David Grossman; Kavon Nasabzadeh; Philip Smith

(57) ABSTRACT

A wireless device receives from a base station one or more messages comprising configuration parameters of a plurality of cells. The plurality of cells comprising one or more first cells of a first type and one or more second cells of a second type. The wireless device determines one or more transmission powers. The wireless device transmits, via one or more cells, one or more signals employing the one or more transmission powers.

20 Claims, 13 Drawing Sheets

Dual-Connectivity- two MAC entities at UE side

(56) References Cited

U.S. PATENT DOCUMENTS

| | | | | |
|---|---|---|---|---|
| 2013/0343288 | A1* | 12/2013 | Ratasuk | H04W 72/1215 370/329 |
| 2015/0011236 | A1* | 1/2015 | Kazmi | H04B 17/27 455/456.1 |
| 2015/0036566 | A1* | 2/2015 | Blankenship | H04W 52/281 370/311 |
| 2015/0208366 | A1* | 7/2015 | Papasakellariou | H04W 52/244 370/311 |
| 2015/0215943 | A1* | 7/2015 | Vajapeyam | H04W 72/0473 370/329 |
| 2015/0245357 | A1* | 8/2015 | Kim | H04L 5/0007 370/311 |
| 2015/0304957 | A1* | 10/2015 | Noh | H04W 52/146 455/522 |
| 2015/0327243 | A1* | 11/2015 | Yin | H04W 52/281 370/329 |
| 2016/0044606 | A1* | 2/2016 | Yin | H04W 52/325 455/450 |
| 2016/0095069 | A1* | 3/2016 | Noh | H04W 52/146 455/452.1 |
| 2016/0105907 | A1* | 4/2016 | Lee | H04W 16/14 370/336 |
| 2016/0174172 | A1* | 6/2016 | Rahman | H04W 52/246 455/522 |
| 2016/0205632 | A1* | 7/2016 | Yi | H04W 52/146 455/522 |
| 2016/0242128 | A1* | 8/2016 | Loehr | H04W 52/34 |
| 2016/0295520 | A1* | 10/2016 | Dinan | H04W 52/242 |
| 2016/0330693 | A1* | 11/2016 | Hwang | H04W 52/146 |
| 2017/0013563 | A1* | 1/2017 | Yang | H04W 52/146 |
| 2017/0013565 | A1* | 1/2017 | Pelletier | H04W 52/146 |
| 2017/0019863 | A1* | 1/2017 | Cariou | H04W 52/283 |
| 2017/0078975 | A1* | 3/2017 | Takeda | H04W 52/30 |
| 2017/0085345 | A1* | 3/2017 | Dinan | H04L 1/0026 |
| 2017/0086172 | A1* | 3/2017 | Dinan | H04W 72/042 |
| 2017/0195978 | A1* | 7/2017 | Lindholm | H04W 52/346 |
| 2017/0215107 | A1* | 7/2017 | Kakishinna | H04W 28/18 |
| 2017/0222776 | A1* | 8/2017 | Dinan | H04L 5/0035 |
| 2017/0231005 | A1* | 8/2017 | Babaei | H04L 5/0007 |
| 2017/0290040 | A1* | 10/2017 | Dinan | H04W 72/1231 |
| 2017/0318594 | A1* | 11/2017 | Babaei | H04W 72/087 |
| 2017/0318595 | A1* | 11/2017 | Dinan | H04W 72/10 |
| 2017/0325175 | A1* | 11/2017 | Dinan | H04W 52/146 |
| 2017/0332410 | A1* | 11/2017 | Babaei | H04W 74/0833 |
| 2017/0339648 | A1* | 11/2017 | Wang | H04W 52/36 |
| 2017/0347326 | A1* | 11/2017 | Dinan | H04W 52/34 |
| 2017/0353972 | A1* | 12/2017 | Babaei | H04W 72/14 |
| 2017/0359733 | A1* | 12/2017 | Yamazaki | H04B 17/15 |
| 2018/0014255 | A1* | 1/2018 | Pelletier | H04W 52/146 |

OTHER PUBLICATIONS

3GPP TS 36.211 V13.0.0 (Dec. 2015), Technical Specification, 3rd Generation Partnership Project; Technical Specification Group Radio Access Network; Evolved Universal Terrestrial Radio Access (E-UTRA);Physical channels and modulation (Release 13), pp. 1-141.
3GPP TS 36.212 V13.0.0 (Dec. 2015), Technical Specification, 3rd Generation Partnership Project; Technical Specification Group Radio Access Network; Evolved Universal Terrestrial Radio Access (E-UTRA);Multiplexing and channel coding (Release 13), pp. 1-121.
3GPP TS 36.213 V13.0.1 (Jan. 2016) Release 13, pp. 1-312.
3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), pp. 1-290.
3GPP TS 36.331 V13.0.0 (Dec. 2015), Technical Specification, 3rd Generation Partnership Project; Technical Specification Group Radio Access Network; Evolved Universal Terrestrial Radio Access (E-UTRA);Radio Resource Control (RRC); Protocol specification (Release 13). pp. 1-507.
R1-160333, 3GPP TSG RAN WG1 Meeting #84, St Julian's, Malta Feb. 15-19, 2016, Agenda Item: 7.3.1.2, Source: ZTE, Title: Discussion on SRS for LAA UL, pp. 1-3.
R1-160301, 3GPP TSG RAN WG1 Meeting #84, St. Julian's, Malta, Feb. 15-19, 2016, Agenda Item: 7.3.1.2, Source: Huawei, HiSilicon, Title: SRS transmission for eLAA, pp. 1-8.
R1-160356, 3GPP TSG RAN WG1 Meeting #84, St Julian's, Malta, Feb. 15-19, 2016, Source: CATT, Title: SRS design for LAA Scell, pp. 1-2.
R1-160562, 3GPP TSG RAN WG1 Meeting #84, St Julian's, Malta, Feb. 15-19, 2016, Agenda item:7.3.1.2, Source: Samsung, Title: Discussion on SRS for UL LAA, pp. 1-4.
R1-160887, 3GPP TSG RAN WG1 #84, Feb. 15-19, 2016, St. Julian's, Malta, Agenda item: 7.3.1.2, Source: Qualcomm Incorporated, Title: SRS design details, pp. 1-3.
R1-160913, c3GPP TSG-RAN WG1 Meeting #84, St. Julian's, Malta, Feb. 15-19, 2016, Agenda item: 7.3.1.2, Source: Nokia Networks, Alcatel-Lucent, Alcatel-Lucent Shanghai Bell, Title: On LAA SRS, pp. 1-3.
R1-160948, 3GPP TSG RAN WG1 Meeting #84, St Julian's, Malta, Feb. 15-19, 2016, Source: NTT Docomo, Inc., Title: Discussion on SRS design for eLAA UL, pp. 1-4.
R1-162101, 3GPP TSG RAN WG1 Meeting #84bis, Busan, Korea, Apr. 11-15, 2016, Agenda Item: 7.3.1.2, Source: Huawei, HiSilicon, Title: Further details on SRS transmission for eLAA, pp. 1-6.
R1-162261, 3GPP TSG RAN WG1 Meeting #84bis, Busan, Korea Apr. 11-15, 2016, Source: CATT, Title: SRS design for Rel-14 eLAA, pp. 1-3.
R1-162324, 3GPP TSG RAN WG1 Meeting #84bis, Busan, Korea Apr. 11-15, 2016, Agenda Item: 7.3.1.2, Source: ZTE Microelectronics Technology, Nubia Technology, Title: Discussion on SRS design for eLAA UL, pp. 1-4.
R1-162356, 3GPP TSG RAN WG1 Meeting #84bis, Busan, Korea, Apr. 11-15, 2016, Agenda item: 7.3.1.2, Source: Intel Corporation, Title: SRS Transmission for eLAA, pp. 1-3.
R1-162665, 3GPP TSG RAN WG1 Meeting #84bis, Busan, Korea Apr. 11-15, 2016, Agenda item: 7.3.1.2, Source: Samsung, Title: Discussion on SRS for Ul LAA, pp. 1-4.
R1-162801, 3GPP TSG RAN WG1 Meeting #84bis, Busan, Korea, Apr. 11-15, 2016, Source: NTT Docomo, Inc., Title: Discussion on SRS design for eLAA UL, pp. 1-4.
R1-162918,3GPP TSG-RAN WG1 Meeting #84bis, Busan, South Korea, Apr. 11-15, 2016, Agenda item: 1.3.1.2, Source: Nokia, Alcatel-Lucent Shanghai Bell, Title: On LAA SRS Design, pp. 1-5.
R1-162938, 3GPP TSG RAN WG1 Meeting #84bits, Busan, Korea Apr. 11-15, 2016, Source: MediaTek Inc., Title: Considerations on SRS for LAA, pp. 1-3.
R1-163024, 3GPP TSG RAN WG1 #84bis, Apr. 11-15, 2016, Busan, Korea, Agenda item: 7.3.1.2, Source: Qualcomm Incorporated, Title: SRS design details, pp. 1-4.

* cited by examiner

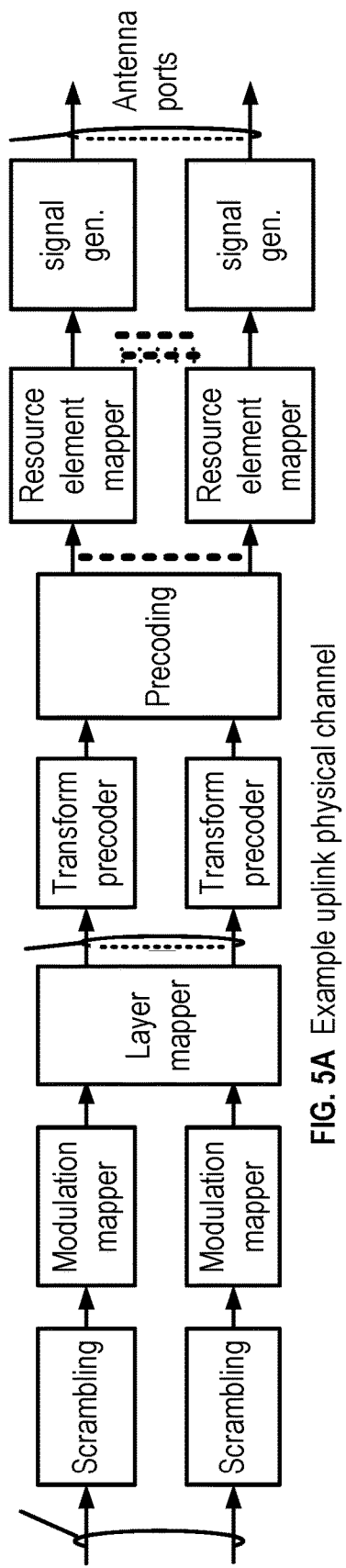
FIG. 5A Example uplink physical channel
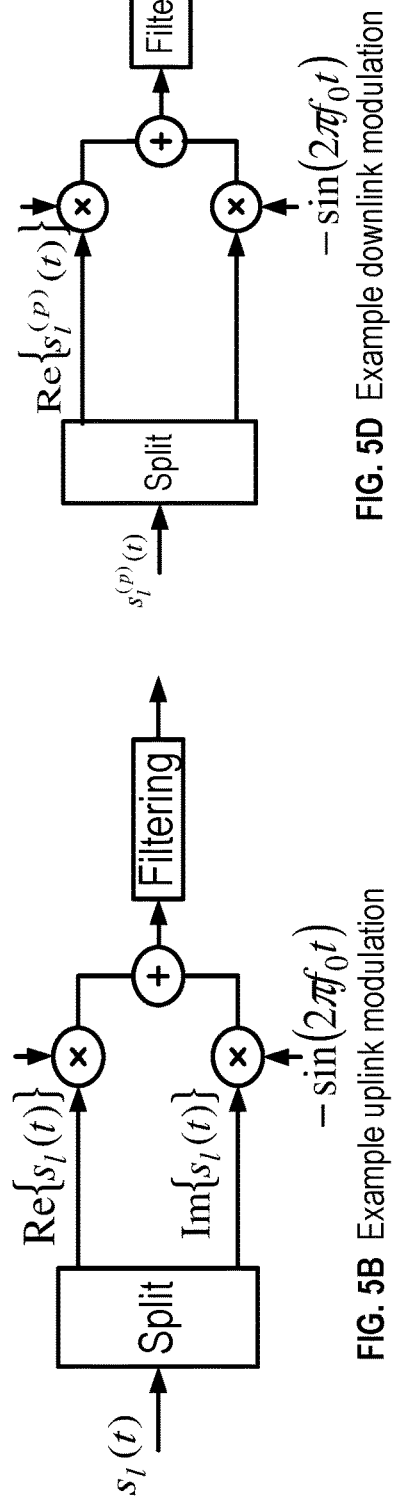
FIG. 5B Example uplink modulation
FIG. 5D Example downlink modulation
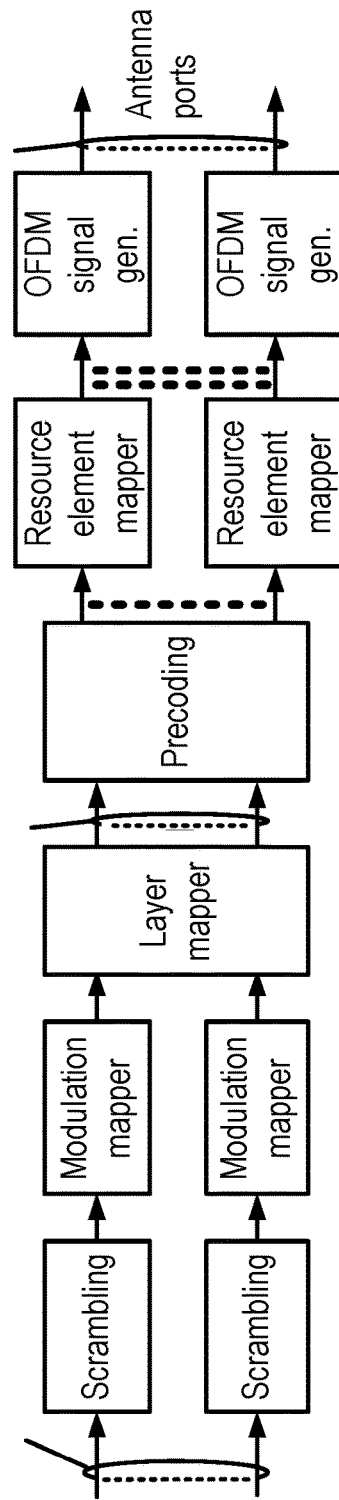
FIG. 5C Example downlink physical channel Dual-Connectivity at eNB

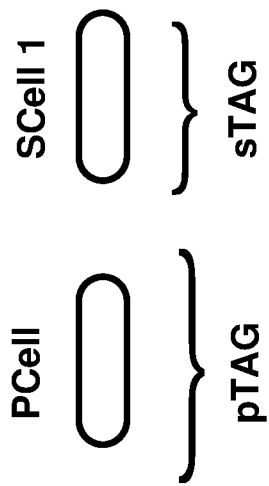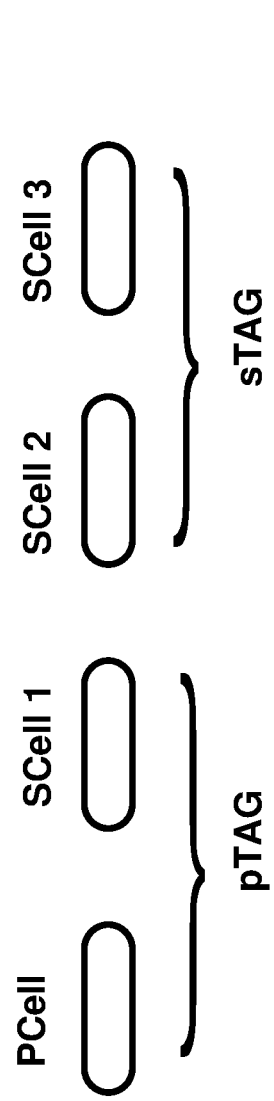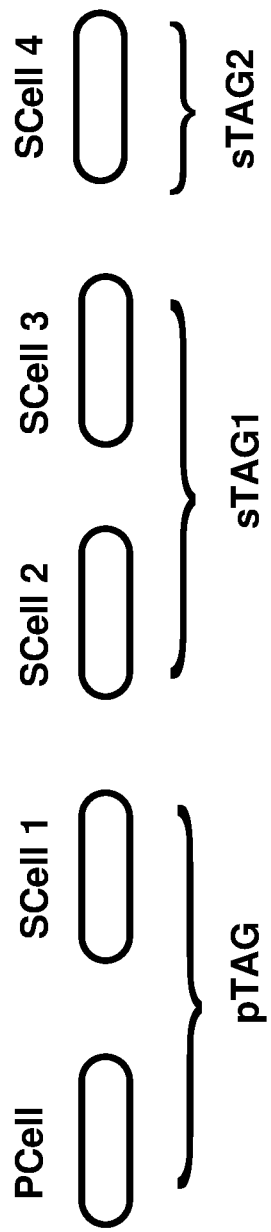
FIG. 8

US 10,536,904 B2

PARALLEL TRANSMISSION IN A WIRELESS DEVICE AND WIRELESS NETWORK

CROSS-REFERENCE TO RELATED APPLICATIONS

This application claims the benefit of U.S. Provisional Application No. 62/333,789, filed May 9, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
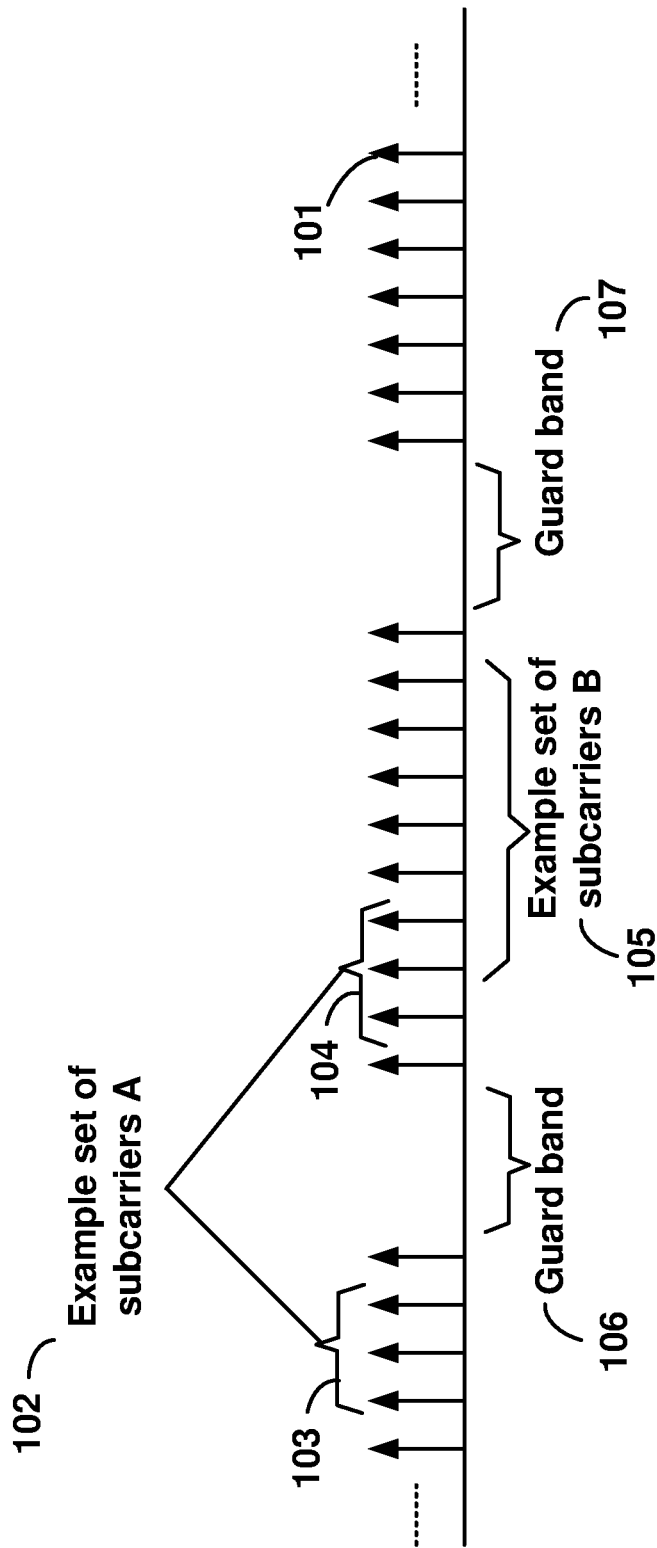
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDMA/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
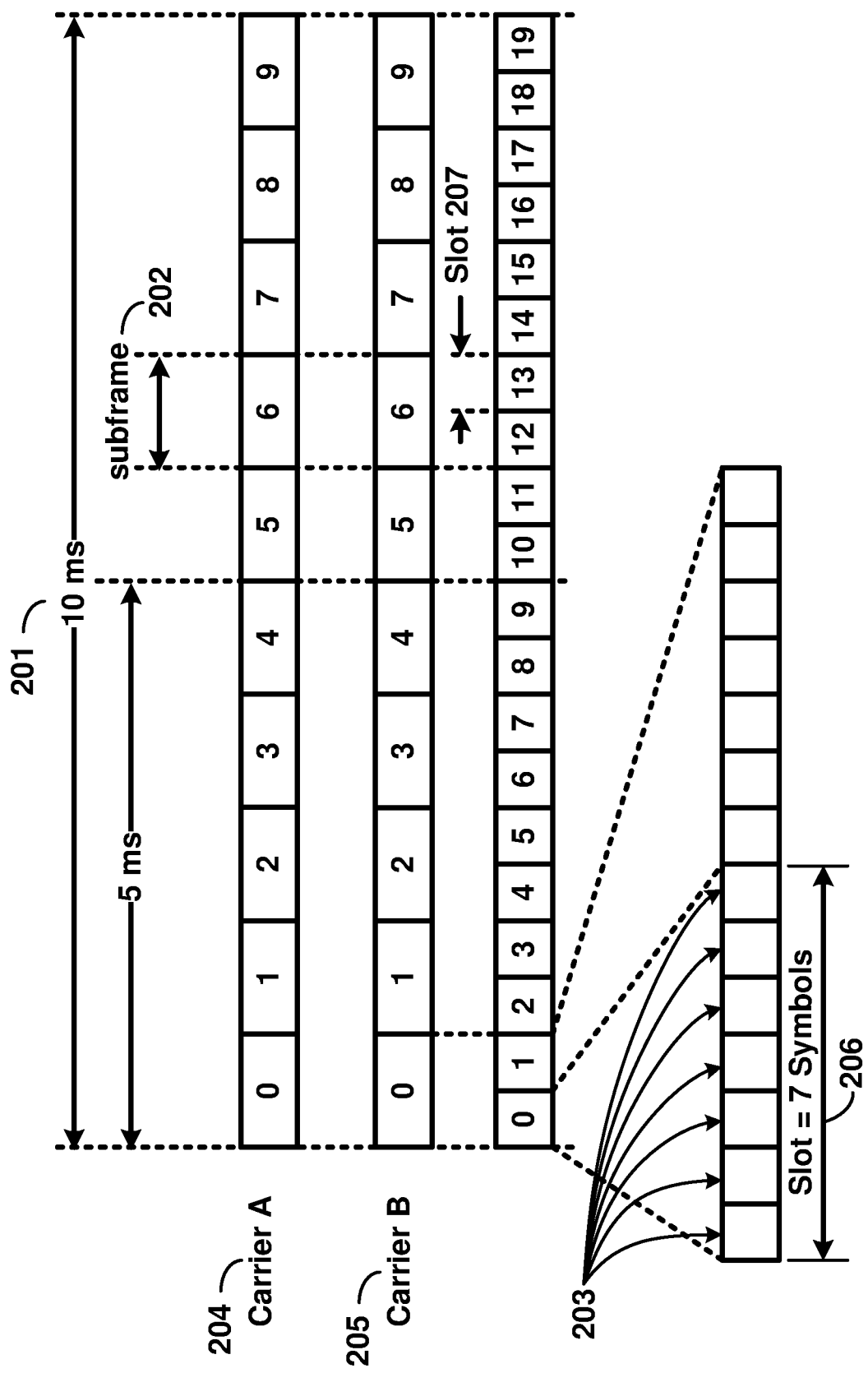
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
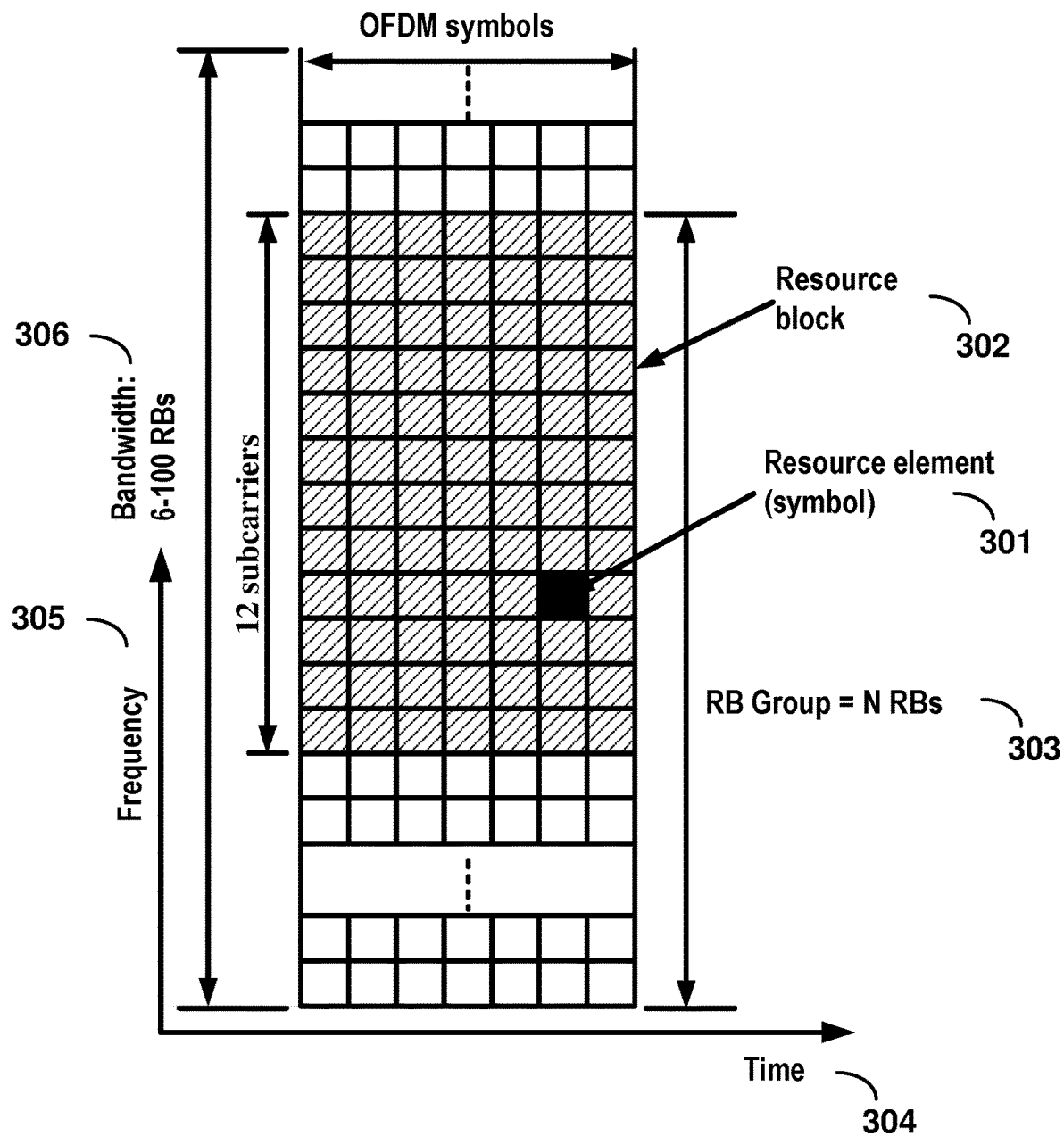
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
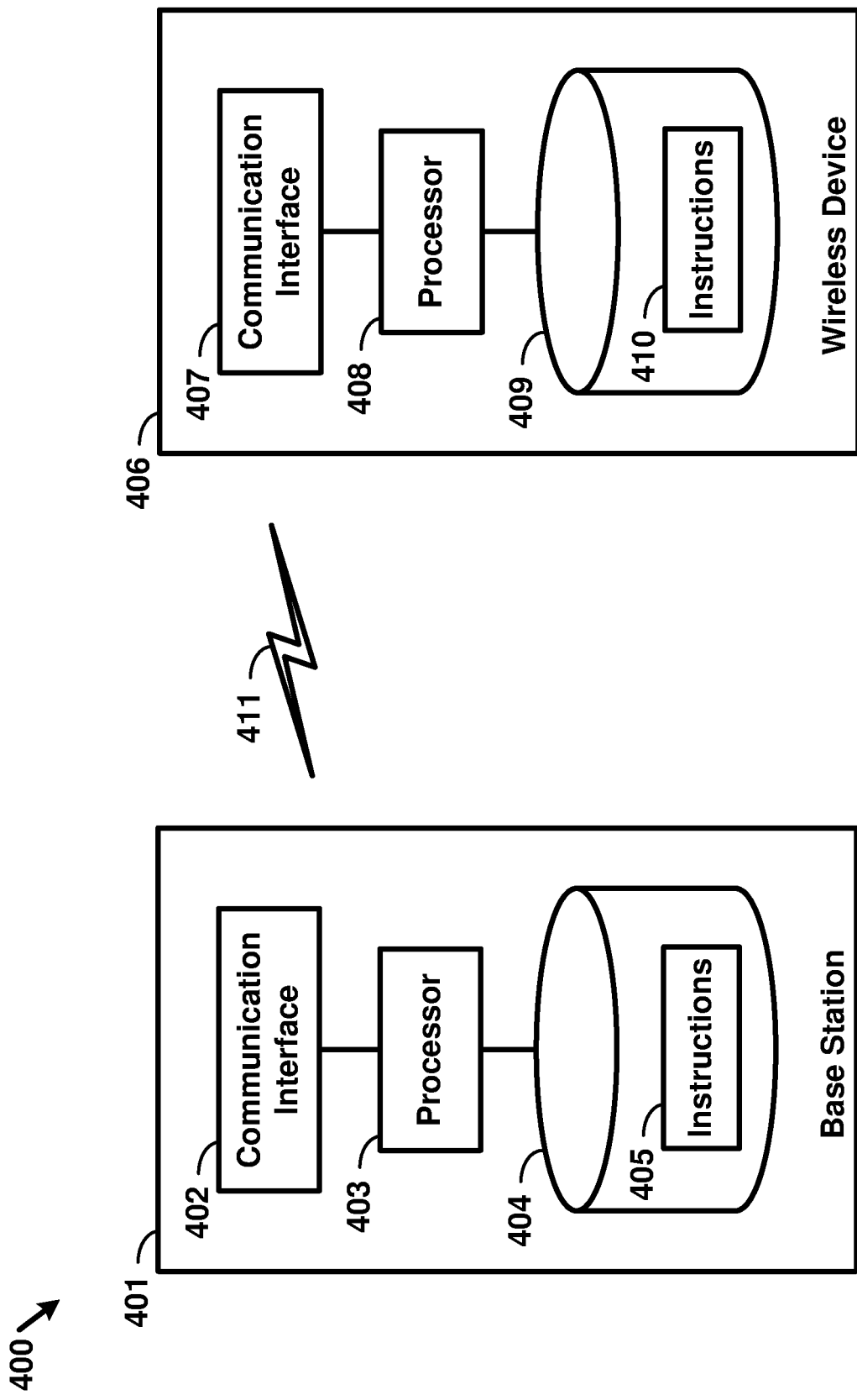
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
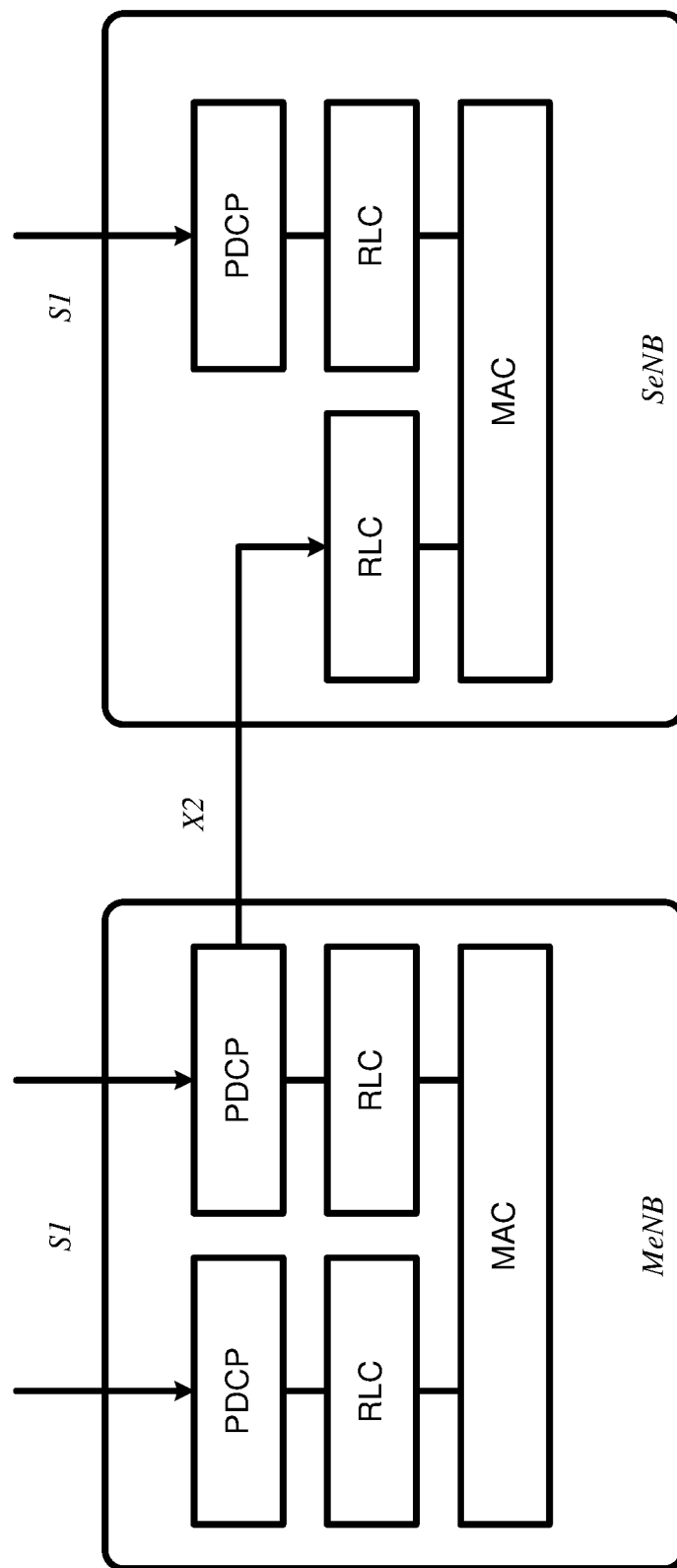
FIG. 6 is an example diagram for a protocol structure with CA and DC as per an aspect of an embodiment of the present disclosure.
Figure 7:
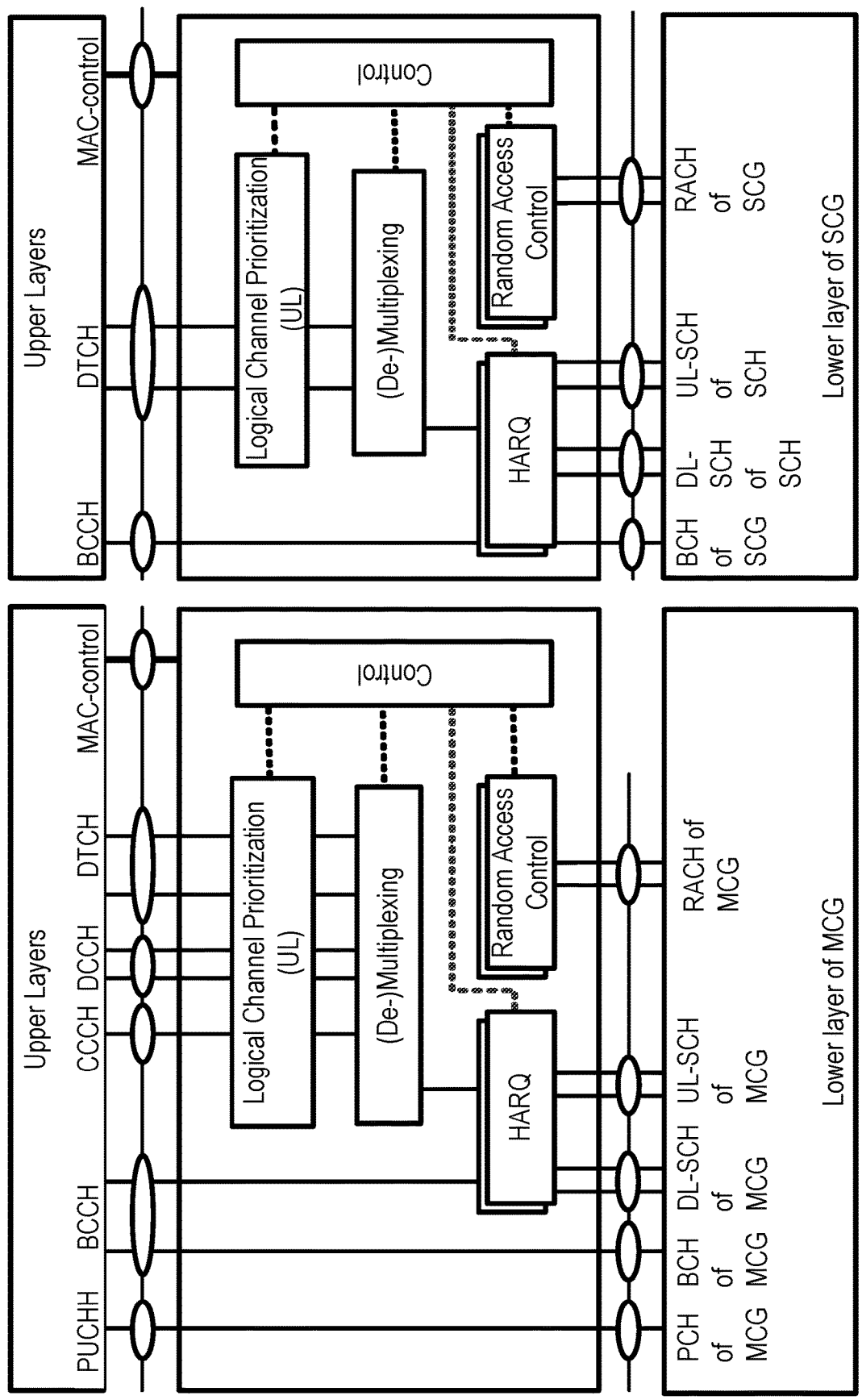
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
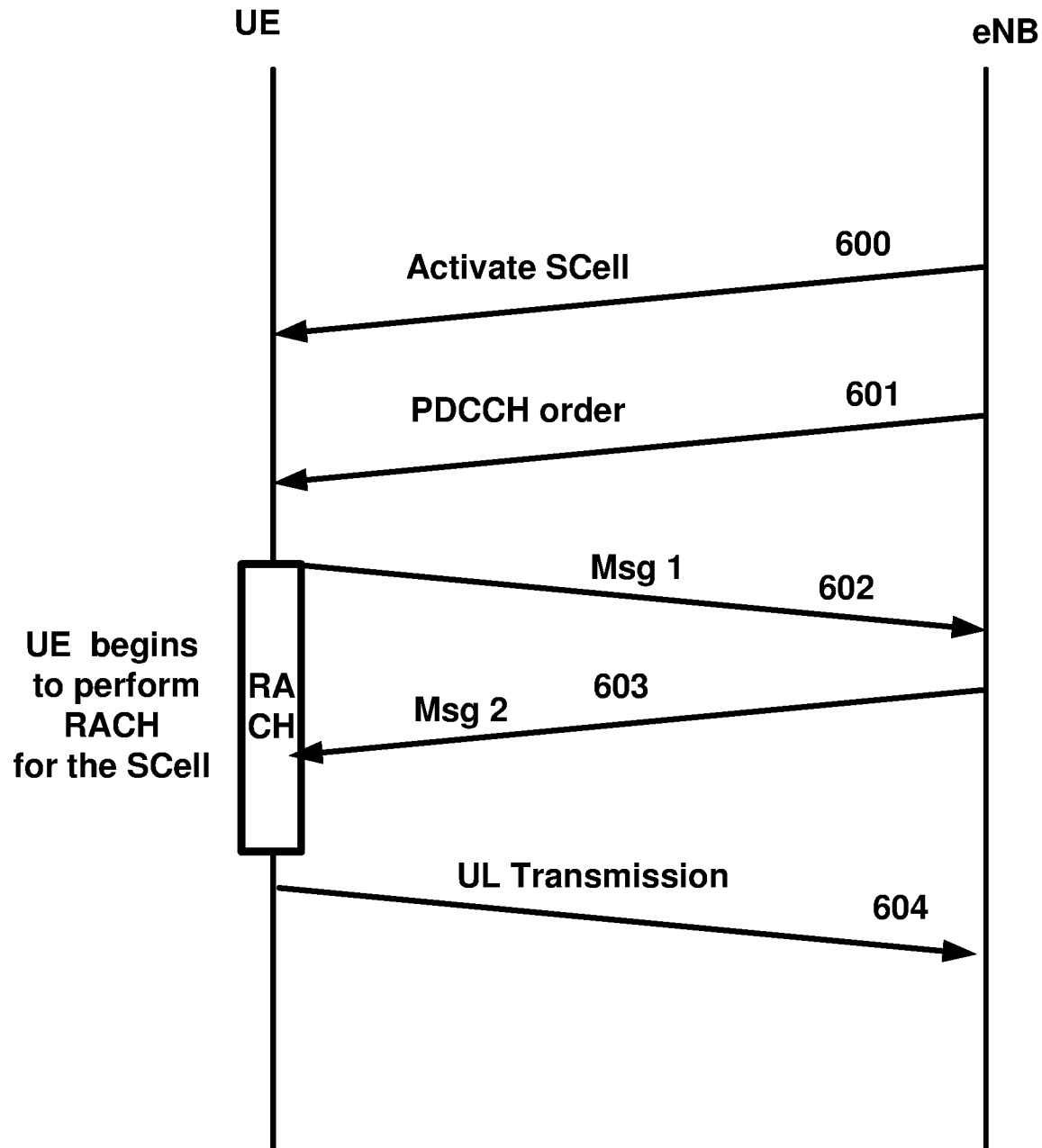
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
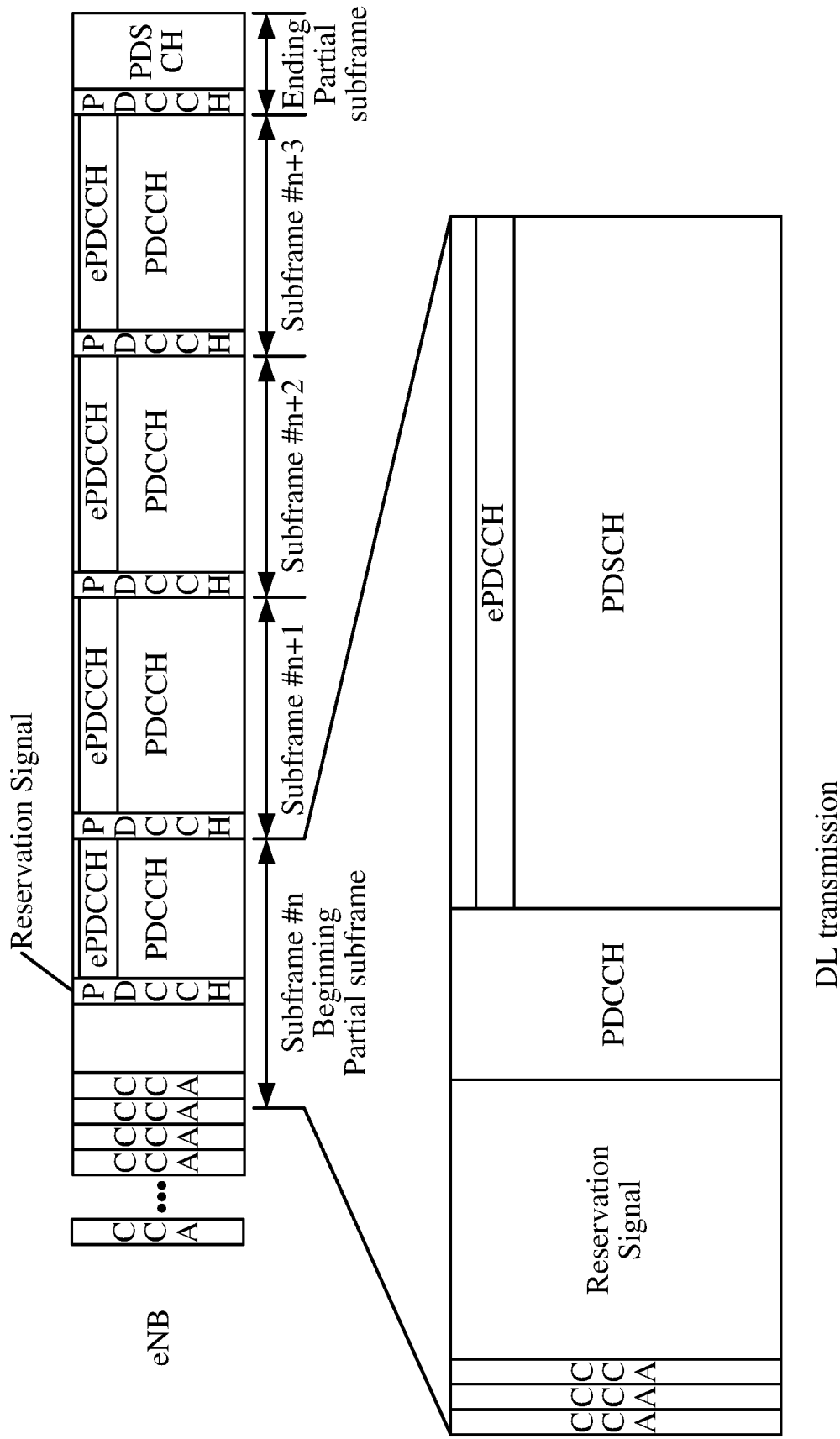
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one cell of a first type (e.g. license cell) and at least one cell of a second type (e.g. unlicensed cell, an LAA cell). The configuration parameters of a cell may, for example, comprise configuration parameters for physical channels, (for example, a ePDCCH, PDSCH, PUSCH, PUCCH and/or the like). The wireless device may determine transmission powers for one or more uplink channels. The wireless device may transmit uplink signals via at least one uplink channel based on the determined transmission powers.

In an example embodiments, LTE transmission time may include frames, and a frame may include many subframes. The size of various time domain fields in the time domain may be expressed as a number of time units $T_s=1/(1500\times 2048)$ seconds. Downlink, uplink and sidelink transmissions may be organized into radio frames with $T_f=307200\times T_s=10$ ms duration.

In an example LTE implementation, at least three radio frame structures may be supported: Type 1, applicable to FDD, Type 2, applicable to TDD, Type 3, applicable to LAA secondary cell operation. LAA secondary cell operation applies to frame structure type 3.

Transmissions in multiple cells may be aggregated where one or more secondary cells may be used in addition to the primary cell. In case of multi-cell aggregation, different frame structures may be used in the different serving cells.

Frame structure type 1 may be applicable to both full duplex and half duplex FDD. A radio frame $T_f=307200 \cdot T_s=10$ ms long and may comprise 20 slots of length $T_{slot}=15360 \cdot T_s=0.5$ ms, numbered from 0 to 19. A subframe may include two consecutive slots where subframe i comprises of slots 2i and 2i+1.

For FDD, 10 subframes are available for downlink transmission and 10 subframes are available for uplink transmissions in a 10 ms interval. Uplink and downlink transmissions are separated in the frequency domain. In half-duplex FDD operation, the UE may not transmit and receive at the same time while there may not be such restrictions in full-duplex FDD.

Frame structure type 2 may be applicable to TDD. A radio frame of length $T_f=307200 \cdot T_s=10$ ms may comprise of two half-frames of length $153600 \cdot T_s=5$ ms. A half-frame may comprise five subframes of length $30720 \cdot T_s=1$ ms. A subframe i may comprise two slots, 2i and 2i+1, of length $T_{slot}=15360 \cdot T_s=0.5$ ms.

The uplink-downlink configuration in a cell may vary between frames and controls in which subframes uplink or downlink transmissions may take place in the current frame. The uplink-downlink configuration in the current frame is obtained via control signaling.

An example subframe in a radio frame, "may be a downlink subframe reserved for downlink transmissions, may be an uplink subframe reserved for uplink transmissions or may be a special subframe with the three fields DwPTS, GP and UpPTS. The length of DwPTS and UpPTS are subject to the total length of DwPTS, GP and UpPTS being equal to $30720 \cdot T_s=1$ ms.

Uplink-downlink configurations with both 5 ms and 10 ms downlink-to-uplink switch-point periodicity may be supported. In case of 5 ms downlink-to-uplink switch-point periodicity, the special subframe may exist in both half-frames. In case of 10 ms downlink-to-uplink switch-point periodicity, the special subframe may exist in the first half-frame.

Subframes 0 and 5 and DwPTS may be reserved for downlink transmission. UpPTS and the subframe immediately following the special subframe may be reserved for uplink transmission.

In an example, in case multiple cells are aggregated, the UE may assume that the guard period of the special subframe in the cells using frame structure Type 2 have an overlap of at least $1456 \cdot T_s$.

In an example, in case multiple cells with different uplink-downlink configurations in the current radio frame are aggregated and the UE is not capable of simultaneous reception and transmission in the aggregated cells, the following constraints may apply. if the subframe in the primary cell is a downlink subframe, the UE may not transmit any signal or channel on a secondary cell in the same subframe. If the subframe in the primary cell is an uplink subframe, the UE may not be expected to receive any downlink transmissions on a secondary cell in the same subframe. If the subframe in the primary cell is a special subframe and the same subframe in a secondary cell is a downlink subframe, the UE may not be expected to receive PDSCH/EPDCCH/PMCH/PRS transmissions in the secondary cell in the same subframe, and the UE may not be expected to receive any other signals on the secondary cell in OFDM symbols that overlaps with the guard period or UpPTS in the primary cell.

Frame structure type 3 may be applicable to LAA secondary cell operation with normal cyclic prefix. A radio frame is $T_f=307200 \cdot T_s=10$ ms long and comprises of 20 slots of length $T_{slot}=15360 \cdot T_s=0.5$ ms, numbered from 0 to 19. A subframe may comprise as two consecutive slots where subframe i comprises slots 2i and 2i+1.

The 10 subframes within a radio frame are available for downlink transmissions. Downlink transmissions occupy one or more consecutive subframes, starting anywhere within a subframe and ending with the last subframe either fully occupied or following one of the DwPTS durations. Subframes may be available for uplink transmission when LAA uplink is supported.

Some regulatory domains, e.g. Europe, may require that the transmission of a node in a band, e.g. 5 GHz band, satisfy some criteria. For example, nominal channel bandwidth (e.g. defined as including the widest of frequencies including guard bands assigned to a single channel) may be at least 5 MHz. The occupied channel bandwidth may be between 80% and 100% of the declared Nominal channel bandwidth. The regulatory may also include power constraint and Power spectral density (PSD) per MHz constraint. A PSD per MHz constraint may not be applicable to licensed spectrum transmission and this may imply that a signal which occupies a small portion of the bandwidth may not be transmitted at a maximum available power at the UE due to the PSD and occupied bandwidth constraints.

In an example, a wireless device may be configured with a plurality of cells of different cell types. A base station may transmit to a wireless device one or more message comprising configuration parameters of a plurality of cells. For example, different cell types may be cells operating on different frequency bands, for examples cells of a first type may operate in a first frequency band and cells of a second type may operate in a second frequency band. For example, different cell types may be cells operating according to different criteria (e.g. regulatory rules, transceiver design, and/or technology limitation). For examples cells of a first type may operate according to a first criteria of and cells of a second type may operate in according to a second criteria. For examples cells of a first type may operate according to a first technology of and cells of a second type may operate in according to a second technology.

In an example, uplink channels in an LAA cell, such as PUSCH, PUCCH, PRACH and/or SRS, may not be transmitted at high power if they do not occupy a wide bandwidth, e.g., entire bandwidth. A signal transmitted in uplink LAA may need to meet the bandwidth occupancy and/or allow transmission at high power by meeting the PSD per MHz constraint. Interleaved transmission may be employed on the uplink which spans the whole bandwidth for a carrier. An interleaved uplink may allow frequency division multiplexing of several uplink transmissions which is one of the design targets for LAA.

In an example, RB interleaved (multi-clustered) transmission, the minimum transmission unit may be one interlace, a set of RBs uniformly spaced in frequency to span a bandwidth. For example, in a 20 MHz system with 100 RBs, the ith interlace may be comprised of 10 RBs {i, i+10, i+20, . . . , i+90}. For example, a 20 MHz system may have 10 interlaces. An interlace may have with 10 RBs in the uplink which may be shared among the users.

An example interleaved structure may allow a UE to occupy a wide bandwidth with at least one RB and may use power boosting to transmit at high power in the unlicensed spectrum thus improving coverage. Transmission at high power may silence more interferers than transmission at lower power and may improve the reception at the eNB receiver and may satisfy the 80% bandwidth occupancy requirement. In an example, the interleaved structure may also be applied to other uplink channels such as PUCCH and/or PRACH. An RB interleaved transmission with 10 RBs uniformly spaced in frequency may be a basic unit of resource allocation on the uplink for 20 MHz and/or 10 MHz eLAA SCell.

By RB level multi-cluster PUSCH transmission, regulatory requirements on the occupied bandwidth may be met if the PUSCH transmission is spread in to a sufficiently large bandwidth. For example, ETSI requirement of power spectral density (shown below) may be satisfied. According to ETSI regulation, the RF output power and power spectral density (PSD) may be constrained in certain unlicensed bands. In addition to limiting PCMAX/PCMAX,C to mean EIRP, LAA UE may also limit the PSD. UL transmission power may be configured to meet the requirement of maximum transmission power and/or PSD.

In an example, transmit Power Control (TPC) may enable an average reduction in the aggregated transmission power by at least 3 dB (5 dB for FWA) compared with a maximum permitted transmission power. TCP may not be required for channels within the band 5150-5250 MHz. Without TPC, a highest permissible average EIRP (density) may be reduced by 3 dB.

According to the regulatory requirements of PSD, transmit power may be uniformly distributed in a bandwidth, in order to reduce the PSD of sub-bands while utilizing the UE total transmit power. In an example, considering of a defined 1 MHz resolution bandwidth for PSD testing, PUSCH signal power may be equally distributed in each 1 MHz bandwidth such that a maximum 23 dBm UE Tx power may be fully utilized, without violating the PSD requirement, e.g. maximum 10 dBm per 1 MHz sub-band. It may be allowed to distribute the PUSCH transmission in 1 MHz subbands at least when the maximum Tx power is utilized, 20 may be considered as the maximum number of PUSCH clusters. In case of reduced Tx power (e.g. the maximum Tx power is not fully utilized), number of PUSCH clusters may be reduced (e.g. 10 clusters). The actual allocated number of clusters may be decided by the eNB scheduler. In an example, for RB level frequency distributed structure with 10 interlaces, if maximum UE Tx power is not less than 20 dBm, 20 clusters corresponding to at least 2 interlaces evenly distributed in frequency may be applied.

To meet regulatory requirements of PSD, PUSCH transmit power may be equally distributed to an allocated transmission bandwidth. Example number of PUSCH cluster 20 may be considered in order to utilize UE Tx power while meeting the regulation on PSD. For example, multiplexing of multiple UE PUSCH with different traffic needs in one UL subframe may be supported for eLAA.

In some countries, maximum PSD (power spectral density) in an unlicensed band may be limited by regulation. PSD of a UE's uplink transmission may be restricted to be compliant with regulation. In an example, UE's uplink transmission power may be adjusted to be compliant with regional regulations on maximum PSD. In an example, maximum uplink PSD may be configured by RRC for an LAA cell. Configuration of maximum uplink transmission power such as Pcmax and/or Pcmax,c may be implemented.

In an example LTE network, once the required QoS is achieved at eNB, UL transmitter power may be reduced to reduce inter-cell interference and/or increase battery life of a UE. In an LAA cell, if a UE with low transmitting power is not detected by a WIFI AP adjacent to an eNB, the WIFI AP may transmit during the UE transmission such that the reception performance at eNB may be degraded. In an example, a hidden node may exist, where a UE UL transmission performance may be reduced by hidden node WIFI AP and the two devices may not be able to listen to each other and therefore transmit simultaneously.

In an example implementation, an eNB may identify the presence and potentially a signal strength of neighbor nodes (e.g. WIFI node) according to network measurement and/or UE measurement reports. An eNB may decide the transmission power target of the UE to enable that a received signal strength of a UE signal at the WIFI AP location to become higher than the CCA threshold, e.g. −62 dBm. The Tx power adjustment may be achieved by eNB signals the proper Po value of the UE power control formula. UL power control mechanism on an LAA cell may be employed to mitigate a hidden node problem.

In legacy LTE, a UE close to an eNB may transmit at low power for uplink transmission, which may not be efficient for the UL LBT operation. UE's uplink transmission power may be configured to be more than a certain level of minimum transmission power. In an example, a minimum transmission power may be configured for a UE employing one or more RRC parameters for LAA SCell.

In Rel-13 LAA, the CCA energy detection threshold for DL LBT may be determined by the presence of other technologies on a long-term basis, set maximum eNB output power for the carrier, and channel bandwidth. In an example, a similar threshold adaptation rule may be used for UL LBT. For example, maximum eNB output power is replaced by the configured maximum output power for that carrier (PCMAX,c) and/or configured upper bound of transmission power (PEMAX, c). The UL LAA LBT is rather conservative if the CCA threshold depends on PCMAX,c or PEMAX, c. The channel access probability of an LAA UE may be reduced.

An actual UL transmit power (e.g. instead of PCMAX,c or PEMAX, c) may be implemented to determine the CCA threshold. In an example, an eNB may make a choice between higher channel access opportunity and higher SINR. For example, on a loaded unlicensed carrier, lower UL transmission power is configured to increase the probability to access the channel with higher CCA threshold.

A UE may reduce the UL transmission power to exchange for a higher CCA threshold. A UE may drop the UL transmission when the UL transmission power derived from the detected energy level of CCA is less than the lower bound configured by eNB.

The energy detection threshold for UL LBT may be similar to that for DL LBT. In an example instead of the maximum transmission power, other alternatives may be considered: Use the PCMAX,c or PEMAX, c, use the actual UL transmit power configured by eNB, and/or use the reduced UL transmit power by UE.

In UL power control operation, the upper bound of UL transmission power is constrained by PCMAX,C and the total configured maximum output power PCMAX, when the UE is configured with more than one CC. PCMAX may vary with the number of aggregated UL CCs. PCMAX,C also depends on the number of PRBs together with the modulation order for intra-band CA. In the case of CA, UE may get the information of scheduled UL transmissions by decoding UL grants for these scheduled UL CCs at almost the same time. The scheduled UL transmissions may be transmitted. A UE may determine the maximum transmit power, and the UE may scale the power of some UL channels/signals with lower priority if it is in power-limited case. There would be several milliseconds (between the subframe UE receives the UL grant and the subframe UE transmits UL channels/signals) to prepare the bits and UL power for the scheduled UL transmissions. In the case of Dual-connectivity, when the UL CCs are not well synchronized, UE may receive the UL grants from one eNB earlier while from the other eNB later, e.g. with up to 1 ms delay between MeNB and SeNB. In that case, the processing time is reduced by at most 1 ms, if UE starts preparing the UL transmission associated with earlier transmission after the reception of UL grants associated with later transmission. The processing time may not be enough. A "non-look-ahead" behaviour may be specified that the transmission power of earlier UL transmission is determined without the consideration of later UL transmission.

In CA-based LAA system, UE may decode UL grants for scheduled UL transmissions at the same time. A UE may not know which UL CCs out of scheduled UL CCs may be transmitted, because the scheduled UL transmission on unlicensed Scells may be dropped due to the failure of LBT. In the case the number of UL CCs finally transmitted is different than that of scheduled, the PCMAX,C and PCMAX may change. It may not be possible for UE to prepare UL transmission power according to PCMAX,C and PCMAX based on the real transmission, since the LBT result is known several microseconds before the transmission. A UE may determine the transmission power according to the scheduled UL CCs, no matter some of these UL CCs may be transmitted or not. UE may suffer power waste when some UL transmissions on unlicensed Scells are dropped. Especially when the power-limited case is identified with the assumption that scheduled UL CCs are to be transmitted, UE reserves power for some UL transmission which is finally dropped while reduces the power for some UL transmission which is definitely to be transmitted. For example, the power of PUSCH on licensed Pcell/Scells is scaled to reserve some power for PUSCH on unlicensed cells, but LBT is failed. It results in poor power efficiency. Besides, it would be undesirable that best-effort transmission on unlicensed Scells affects the traffic with higher QoS requirement, which is typically carried by licensed CCs.

In an example, UL transmission power may be determined according to scheduled PUSCH transmission. A power allocation mechanism between licensed and unlicensed CCs may be implemented for when a UE is power limited. The mechanism may improve the power efficiency as well as provides an improved performance for higher QoS/priority traffic. In case of maximum transmission power limitation, handling of transmissions on multiple carriers including LAA SCell may be decided. Transmissions on LAA SCell may be deprioritized to the transmissions on licensed carriers.

In legacy LTE, power headroom indicates the difference between the maximum transmit power and the current transmit power. An eNB may determine the UL resource allocation based on the PHR. There are two types of PHR, virtual PHR and real PHR. The virtual PHR may be reported when there is no UL transmission on the corresponding UL CC, e.g., when an eNB does not schedule the UL transmission in some subframes. A real PHR is reported when there is UL transmission, which is based on a real transmission. Uplink power headroom for PHR (power headroom report) in a subframe may calculated based on the calculated transmission power on a carrier if PUSCH or PUCCH is transmitted in a carrier. Otherwise, power headroom is calculated based on the virtual transmission power of PUSCH or PUCCH.

In an LAA cell, the UL transmission is subject to LBT, and a scheduled UL transmission may be dropped if the channel is busy. A UE may estimate the power headroom with the assumption of a real transmission, e.g., received UL grant. The type of PHR may be determined by the scheduling information of UL transmission instead of real transmission. A reported PCMAX,C in PHR is also determined based on a scheduled UL transmission instead of real transmission.

Uplink transmission on an LAA SCell may be dropped within a short time (e.g. few micro seconds) before the subframe boundary due to LBT failure. It may not be possible to modify the PHR information encoded in a PUSCH reflecting the LBT results of other carriers. In an example, PHR in a subframe may be calculated reflecting the uplink transmissions scheduled in LAA cell in the subframe regardless whether actual transmission is performed or not. PHR for an LAA cell may be generated according to a scheduled UL transmission indicated by an UL grant.

LTE release-13 UL power control mechanisms may be enhanced to support transmission of signals in the uplink of a plurality of cells of different cell types (e.g. licensed cells and LAA cells). LTE UL power control may reduce a UE transmission power as long as the reception performance at eNB satisfies the requirement. The eNB may transmit TPC for uplink transmission. In an example, uplink transmission in an LAA cell with LBT operation in the LAA cell, a UE transmission power may be employed by other wireless devices within certain coverage to prevent uplink transmission by other nodes and creating interference.

In an example, uplink power control may reduce UL transmit power to a relatively low level. Uplink transmit power of below a threshold may not be suitable for LAA operation on an unlicensed carrier Enhancement of UL power control algorithms suitable for LBT operation may be considered. In an example embodiment, a UE's minimum transmit power may be configured (via one or more parameters in one or more RRC message) to reduce the possibility of other UEs detecting the channel free and starting transmission and interfering with the UE. A UE may be configured to transmit above a minimum transmit power value on an LAA cell. In an example embodiment, this may be enabled even if the eNB is able to detect its signal at below the minimum value.

In an example, in an LAA cell, a maximum transmit power spectral density may be limited, e.g. the power limit may depend on transmission bandwidth. Maximum allowed transmission power may depend on transmission bandwidth. The power control in the current LTE systems may limit maximum total output power of a UE via configurable maximum transmit power PCMAX independent of transmission bandwidth (the number of RBs used for uplink transmission). The current LTE systems do not provide a capability for configuration of maximum power depending based on the uplink transmission bandwidth (the number of RBs in an uplink transmission). Enhancements may be considered to control the maximum transmit power spectral density of a UE in an unlicensed band. Mechanisms may be implemented to allocate UEs transmit power to different cells including licensed cell and LAA cells, e.g. when the UE is power limited.

In an example embodiment, a UE may calculate transmit power for PRACH, PUSCH, PUCH, and/or SRS in the uplink according to a power control formula. The calculations of uplink transmit power for a signal may employ uplink power calculations in release 13 with additional enhancements to improve uplink transmission power for different cell types.

Figure 11:
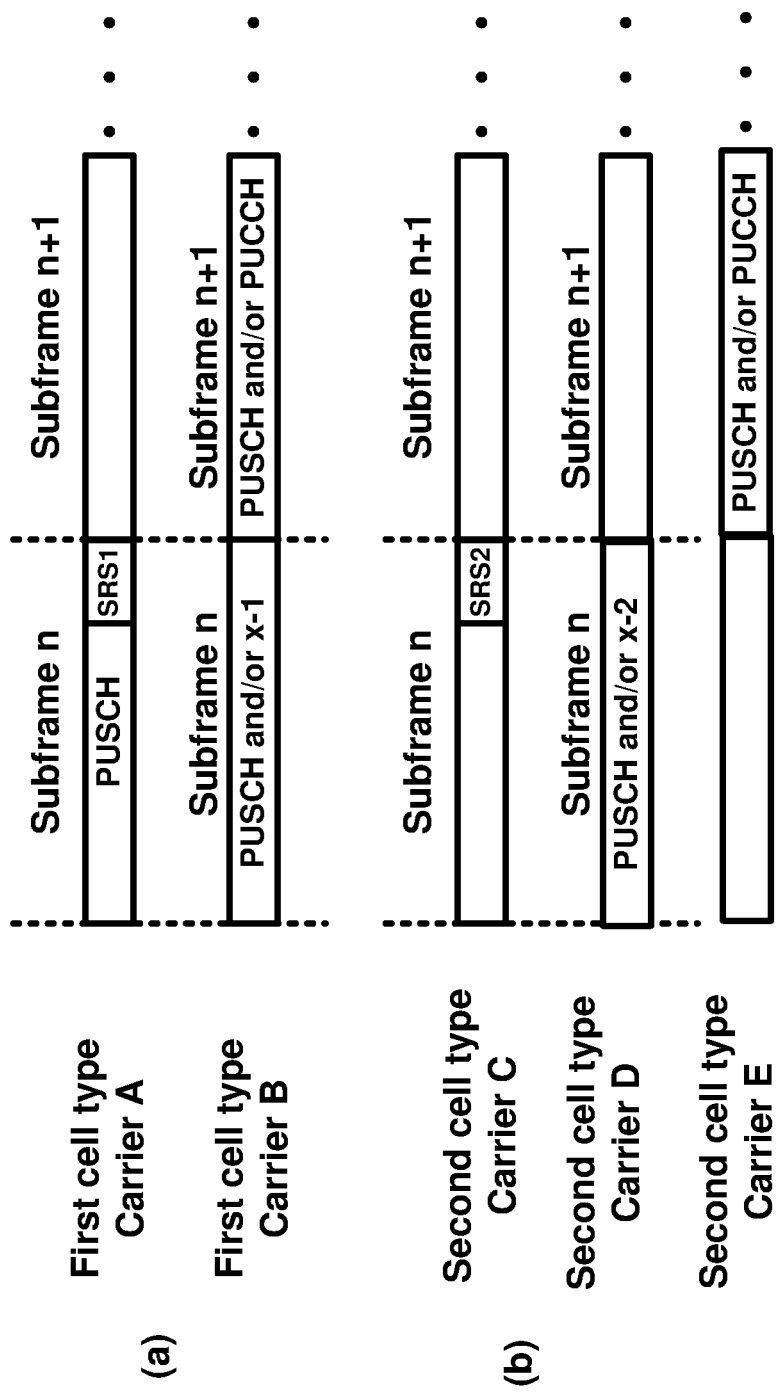
FIG. 11 is an example diagram depicting uplink transmissions via a plurality of cells as per an aspect of an embodiment of the present disclosure.

Uplink transmission power of PUSCH, PUCCH, and/or SRS may be adjusted (scaled down) when uplink transmit power of serving cells exceed maximum transmit power of the UE. For example, In FIG. 11, powers may be calculated for uplink signals (e.g. PUSCH and/or PUCCH) on carriers B and E in subframe n+1. If a total maximum calculated transmit power does not exceed the max transmit power of the UE, the UE may transmit signals on carriers B and E according to a calculated power. If the total maximum calculated transmit power exceed the max transmit power of the UE, the UE may transmit signals on carriers B and E according to a predefined rule by adjusting (scaling) the transmission power. In an example, a UE may drop one or more signals, and transmit one or more other signals to meet the power requirements. In an example embodiment, SRS signals may be dropped if SRS signals cannot be transmitted in parallel with PUSCH and/or PUCCH signals in a cell group (MCG, SCG).

Example power control formulas for calculating the power of PUSCH, PUCCH and SRS in different scenarios are presented below. In an example, some additional enhancements may be made to power control mechanisms to improve power control efficiency in an LAA cell.

In an example implementation, the setting of the UE Transmit power for a Physical Uplink Shared Channel (PUSCH) transmission may be determined as follows.

If the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

If the UE transmits PUSCH simultaneous with PUCCH for the serving cell c, then the UE transmit power $P_{PUSCH,c}(i)$ for the PUSCH transmission in subframe i for the serving cell c may be given by $$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

If the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c may be computed by $$P_{PUSCH,c}(i) = \min\{P_{CMAX,c}(i), P_{O\_PUSCH,c}(1) + \alpha_c(1) \cdot PL_c + f_c(i)\} \text{ [dBm]}$$

In an example implementation, if serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c may be determined by $$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} \text{[dBm]}$$

If serving cell c the primary cell, for PUCCH format 4/5, the setting of the UE Transmit power $P_{PUCCH}$ for the physical uplink control channel (PUCCH) transmission in subframe i for serving cell c may be determined by $$P_{PUCCH}(i) = \min \begin{Bmatrix} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{Bmatrix} \text{[dBm]}$$

If the UE is not transmitting PUCCH for the primary cell, for the accumulation of TPC command for PUCCH, the UE may assume that the UE transmit power $P_{PUCCH}$ for PUCCH in subframe i is computed by $$P_{PUCCH}(i) = \min\{P_{CMAX,c}(i), P_{0\_PUCCH} + PL_c + g(i)\} \text{ [dBm]}$$

In an example implementation, the setting of the UE Transmit power $P_{SRS}$ for the SRS transmitted on subframe i for serving cell c may be determined by $$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\} \text{ [dBm]}$$

There is a need to determine the transmit power of signals in an LTE network when cell of different types are configured/activated and a UE is power limited. Example embodiments present a mechanism for determining the power of uplink signals in a UE. There is a need to develop mechanisms for determining the transmit power of uplink signals in different cell types.

In an example implementation and when one cell type is configured and activated, if the UE is not configured with an SCG or a PUCCH-SCell, and if the total transmit power of the UE would exceed $\hat{P}_{CMAX}(i)$, the UE may scale $\hat{P}_{PUSCH,c}(i)$ for the serving cell c in subframe i such that the condition $$\sum_c w(i) \cdot \hat{P}_{PUSCH,c}(i) \leq (\hat{P}_{CMAX}(i) - \hat{P}_{PUCCH}(i))$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ in subframe i and w(i) is a scaling factor of $\hat{P}_{PUSCH,c}(i)$ for serving cell c where $0 \leq w(i) \leq 1$. In case there is no PUCCH transmission in subframe i $\hat{P}_{PUCCH}(i)=0$.

If the UE is not configured with an SCG or a PUCCH-Scell, and if the UE has PUSCH transmission with UCI on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe i such that the condition $$\sum_{c \neq j} w(i) \cdot \hat{P}_{PUSCH,c}(i) \leq (\hat{P}_{CMAX}(i) - \hat{P}_{PUSCH,j}(i))$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling is applied to $\hat{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$.

For a UE not configured with a SCG or a PUCCH-SCell, note that w(i) values are the same across serving cells when w(i)>0 but for certain serving cells w(i) may be zero.

If the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i)))$$

and $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

For a BL/CE UE configured with CEModeA, if the PUSCH is transmitted in more than one subframe i0, i1, ..., iN−1 where i0<i1<...<iN−1, the PUSCH transmit power in subframe ik, k=0, 1, ..., N−1, is determined by $P_{PUSCH,c}(i_k) = P_{PUSCH,c}(i_0)$. For a BL/CE UE configured with CEModeB, the PUSCH transmit power in subframe ik is determined by $P_{PUSCH,c}(i_k) = P_{CMAX,c}(i_0)$.

In an example embodiment, different power priorities may be assigned to transmission power of different signals in a CG. In an example, the following power priorities may be considered:

In an example embodiment, signals transmitted on a cell of a second type (e.g. an LAA cell) may be assigned a lower priority compared with signals transmitted on a cell of a first type (e.g. licensed cells). For example, the following power priorities may be considered: (_L1 denotes signals on a cell of a first type and _L2 denotes signals on a cell of a second type).

PRACH>PUCCH>PUSCH_L2 with UCI>PUSCH_L1
UCI>PUSCH_L2>PUSCH_L1

In an example, parallel PRACH transmission on a cell of a first type and a cell of a second type (e.g. licensed and LAA cells) may not be supported. In an example, PUCCH may be configured on a cell of a first type (e.g. licensed cells) and no PUCCH may be configured on a cell of a second type (e.g. an LAA cell).

Example power priority may provide a higher transmit power priority to signals transmitted on cells of a second type (e.g. LAA cells). For example, this may enable reserving LAA cells and accessing LAA channels with a higher probability. For example, successful access to LAA cells may require transmission with higher power. Access to LAA cells requires LBT and LAA cells may have a higher interference. Low signal transmission power on LAA cells may substantially increase access failure. There is no need for LBT on licensed cells and licensed cells may be less sensitive to power reduction. For example, when PUSCH,j transmits PUSCH_L1 with UCI, the PUSCH_L2 UCI signal power may be adjusted so that:

$$P_{PUSCH,j}(i) \leq (\hat{P}_{CMAX}(i) - \hat{P}_{PUCCH}(i) - \hat{P}_{PUSCH\_UCI\_L2}(i))$$

PUSCH_L1 signal power may be adjusted based on:

$$\sum_{c \neq j} w(i) \cdot \hat{P}_{PUSCH\_L2,c}(i) \leq$$
$$(\hat{P}_{CMAX}(i) - \hat{P}_{PUCCH}(i) - \hat{P}_{PUSCH,j}(i) - P_{PUSCH\_UCI\_L2}(i))$$

PUSCH_L2 signal power may be adjusted based on:

$$\sum_{c \neq j} w(i) \cdot \hat{P}_{PUSCH\_L1,c}(i) \leq \left( \hat{P}_{CMAX}(i) - \hat{P}_{PUCCH}(i) - \hat{P}_{PUSCH,j}(i) - P_{PUSCH\_UCI\_L2}(i) - \sum_{c \neq j} \cdot \hat{P}_{PUSCH\_L2,c}(i) \right)$$

In an example embodiment, the priorities may be managed based on assigning different weighting factors, w(i), to cells of a first type and cell of a second type. For example, a first type cell power may be adjusted employing, wl1(i) factor. A second type cell power may be adjusted employing wl2(i) factor.

For example, $$\sum_{c \neq j} wl2(i) \cdot \hat{P}_{PUSCH\_L2,c}(i) + \sum_{c \neq j} wl1(i) \cdot \hat{P}_{PUSCH\_L1,c}(i) \leq$$
$$(\hat{P}_{CMAX}(i) - \hat{P}_{PUCCH}(i) - \hat{P}_{PUSCH,j}(i) - P_{PUSCH\_UCI\_L2})$$

In an example, a similar method may be applied to power calculations of PUSCH transmission with UCI.

In an example embodiment, an RRC message may comprise one or more parameters that are employed for calculation of wl1(i) factor and wl2(i) factor. For example, an offset may be configured for the relative weight factors on cells of a first type and cells of a second type (e.g. licensed and LAA cells).

In an example embodiment, SRS signals may be assigned a lower power priority compared with other signals, e.g. PUCCH, PRACH, and/or PUSCH.

In Release-13, a UE not configured with multiple TAGs may not transmit SRS in a symbol whenever SRS and PUSCH transmissions happen to overlap in the same symbol in the same CG (MCG or SCG). Such mechanism may increase SRS dropping probability.

Enhanced mechanisms introduced in example embodiments of the invention reduces SRS dropping probability. In many instances SRS signals are transmitted in parallel with PUSCH and/or other signals (e.g. PUCCH, reservation signals, other SRSs) in parallel in the same Cell Group (MCG and/or SCG).

In many scenarios, the UE may not have enough transmission power to transmit SRS signals and PUSCH and/or other signals in parallel Enhanced power control mechanisms are required to enable enhanced SRS transmission mechanisms when UE is power limited.

Figure 12:
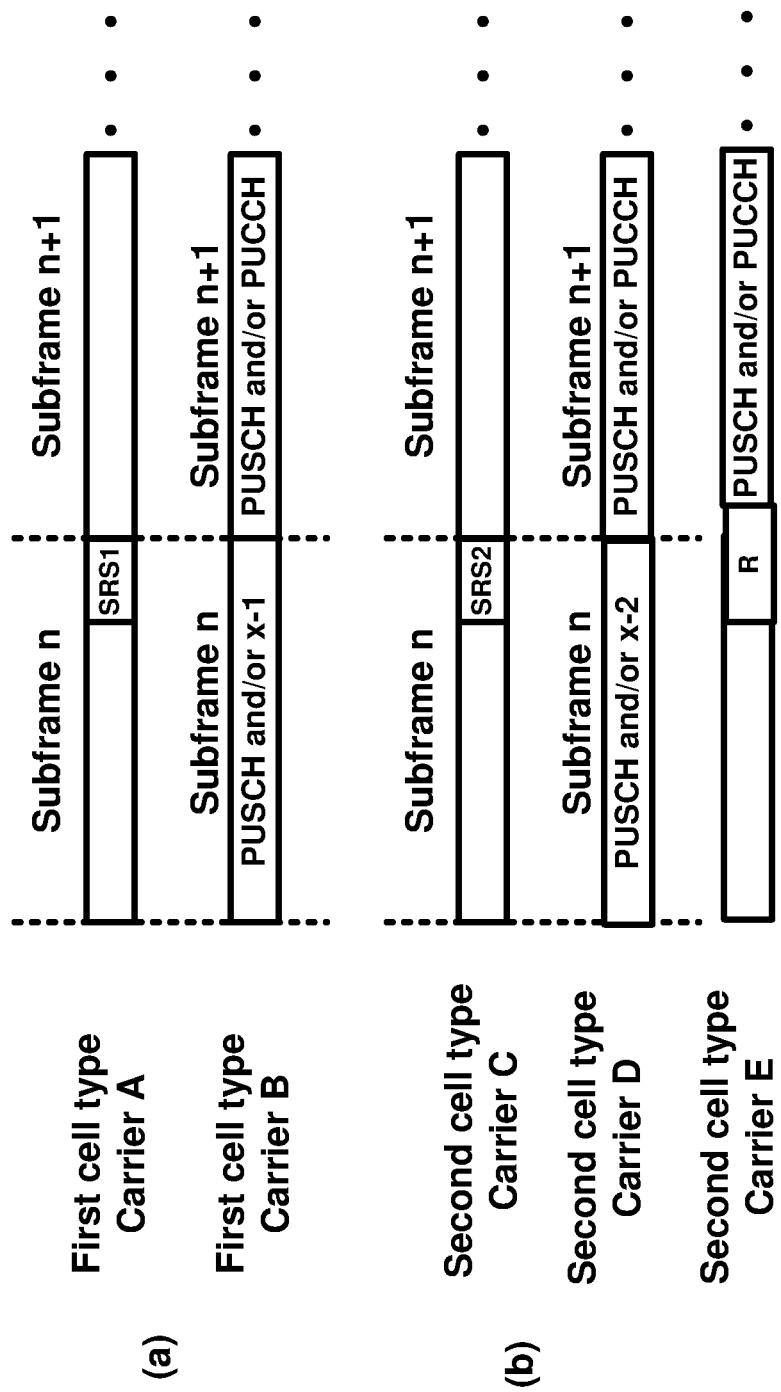
FIG. 12 is an example diagram depicting uplink transmissions via a plurality of cells as per an aspect of an embodiment of the present disclosure.
Figure 13:
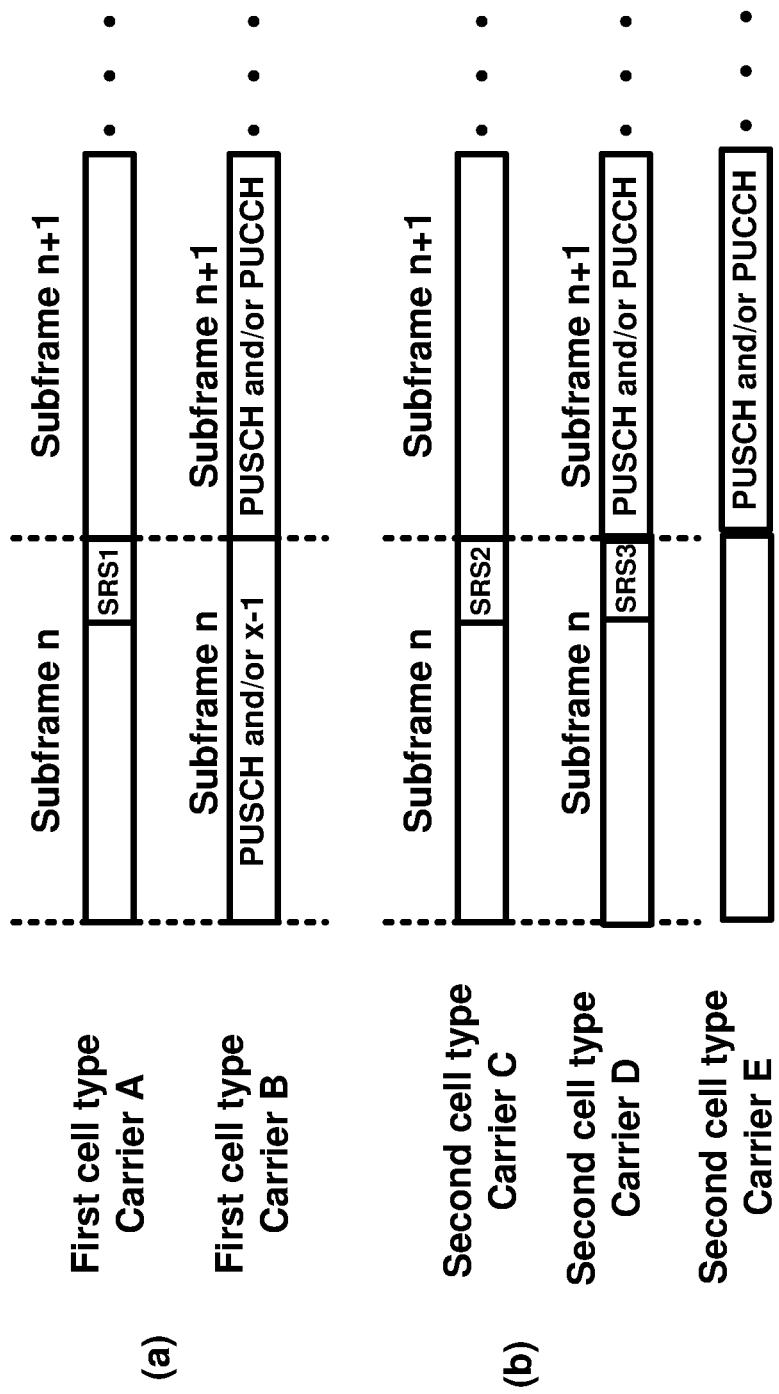
FIG. 13 is an example diagram depicting uplink transmissions via a plurality of cells as per an aspect of an embodiment of the present disclosure.

FIG. 12 and FIG. 13 illustrate examples, wherein SRS signals are transmitted in parallel with PUSCH and/or other signals and/or reservation signal. Many different combinations are possible. In an example implementation, transmission of reservation signals (R) may not be implemented in the UE. In another example implementation, transmission of reservation signals may be implemented in the UE.

In an example embodiments transmission powers may be assigned different transmission priorities. Assigning different transmission priorities to different signals in an enhanced SRS transmission mechanism may simplify the power management in the UE. In an example embodiment, there may be many implementations for handling signals with lower priorities, when the UE does not have enough transmission power. In one example embodiment, signals with lower priorities may be dropped when the UE does not have enough transmission power. In an example embodiment signals with lower priorities may be adjusted (scaled down) when the UE does not have enough transmission power. In an example embodiment, some of the signals with lower priorities may be dropped, and some others may be adjusted (scaled down) when the UE does not have enough transmission power.

For simplicity we may consider one CG in the following example embodiments. When DC or PUCCH CGs are configured, the UE may combine the example embodiments in a CG along with CG power control mechanisms disclosed in the specification.

In an example embodiment, SRS transmission power may be assigned a lower priority compared with PUCCH, and PUSCH and R signal transmissions. In an example embodiment, there may be many implementations for handling signals with lower priorities, when the UE does not have enough transmission power. In one example embodiment, SRS may be dropped when the UE does not have enough transmission power. In an example embodiment SRS power may be adjusted (scaled down) when the UE does not have enough transmission power. In an example embodiment, some of the SRS signals with lower priorities may be dropped, and some other SRSs may be adjusted (scaled down) if needed when the UE does not have enough transmission power. For example, SRS in licensed bands or unlicensed bands may be dropped. In another example, a first type of SRS may be dropped and a second type of SRS may be transmitted and/or scaled down if needed.

In an example embodiment, SRS transmission power may be assigned a lower priority compared with PUCCH, and PUSCH signal transmissions, but not R signal transmissions. R signals transmission power may be assigned a lower priority compared with SRS. R signal transmission power may be scaled down or R signal may be dropped when the UE does not have enough transmit power.

The UE may calculate remaining power for SRS transmission according to the defined priorities.

In an example embodiment, when the UE does not have enough power to transmit SRS and PUSCH in parallel in multiple cells, the UE may drop SRS transmissions across the cells in a CG. This mechanism may be simple but may increase the probability of SRS dropping in the UE.

In an example embodiment, when the UE does not have enough power to transmit SRS and PUSCH in parallel in multiple cells, the UE may consider different priorities for SRS signals in cells of a first type and cells of a second type (e.g. LAA cells and licensed cells).

For example, the UE may consider higher priority for SRS transmission on cells of a second type (e.g. LAA cells) compared with cells of a first type (e.g. licensed cells). For example, the UE may drop SRS transmissions across cells of a first type (e.g. licensed cells) in a CG. The UE may transmit SRS transmissions across cells of a second type (e.g. LAA cells) in a CG if it has sufficient power. If the UE does not have sufficient power to transmit SRS on only cells of a second type (e.g. LAA cells), then the UE may drop (or scale down power of) SRS transmission on cells of a second type (e.g. LAA cells).

For example, the UE may consider higher priority for SRS transmission on cells of a first type (e.g. licensed cells) compared with cells of a second type (e.g. LAA cells). For example, the UE may drop SRS transmissions across cells of a second type (e.g. LAA cells) in a CG. The UE may transmit SRS transmissions across cells of a first type (e.g. licensed cells) in a CG if it has sufficient power. If the UE does not have sufficient power to transmit SRS on only cells of a first type (e.g. licensed cells), then the UE may drop (or scale down power of) SRS transmission on cells of a first type (e.g. licensed cells).

In an example embodiment, SRS signals that are transmitted in a subframe of a serving cell that does not include PUSCH transmission may be prioritized differently from SRS signals that are transmitted in a subframe of a serving cell that includes transmission of PUSCH. For example, this may allow the UE to drop if SRS is transmitted alone without PUSCH in the subframe, when the UE is power limited, while the UE transmits SRS in a cell with PUSCH in the subframe of the cell (if UE has enough power). In another example, this may allow the UE to drop if SRS is transmitted with PUSCH in the subframe, when the UE is power limited, while the UE transmits SRS in a cell without PUSCH in the subframe of the cell (if UE has enough power).

In an example embodiment, SRS signals adjacent to PUSCH transmission (in the same or subsequent subframe) may be prioritized differently from SRS signals that are not adjacent to PUSCH. For example, this may allow the UE to drop if SRS is transmitted alone without PUSCH, when the UE is power limited, while the UE transmits SRS adjacent with PUSCH in the cell (if UE has enough power). In another example, this may allow the UE to drop if SRS adjacent PUSCH in the subframe, when the UE is power limited, while the UE transmits SRS that is not adjacent to PUSCH in the cell (if UE has enough power).

In an example embodiment, a UE may consider power scaling for SRS transmission in addition to the above priorities. This may allow the UE to transmit SRSs when adjusted (scaled down) transmission power when SRS transmission at the calculated power exceeds maximum transmission power. Instead of dropping SRSs of certain category, the UE may scale down the power of SRS transmission of a category. The lower category of SRS may still be dropped (if there is not enough power to transmit the SRS). In some embodiments different SRS transmissions may be considered of the same power category and/or priority.

In legacy LTE systems, a maximum allowable transmit power is not dependent on a number of configured and activated cells. In an example embodiment, a maximum allowable transmit power in a UE may depends on whether cells of a second type (e.g. LAA cells) are configured and activated. In an example embodiment, cells of a second type may follow different regulatory requirements related to transmit power. For example, a UE that does not transmit on any activated cells of a second type, may have a maximum transmit power P_cmax. When the UE is configured and transmits signals on cells of a second type, it may be allowed to transmit additional power exceeding P_cmax on activated licensed and cells of a second type. Different implementation mechanisms may be employed. An eNB may transmit one or more RRC messages comprising configuration parameters of cells. Configuration parameters may comprise one or more parameters indicating a first maximum allowable transmit power when cells of a first type (e.g. licensed cell) are configured and activated and a second maximum allowable transmit power when cell of a first type and cells of a second type are configured and activated. In an example, maximum allowable transmit powers may be computed based on one or more parameters by a UE.

In an example, a maximum allowable transmit power when licensed cells are configured and activated may be P1. A maximum allowable transmit power when licensed and cells of a second type (e.g. LAA cells) are configured and activated may be P2. In an example, a power P2−P1 may be employed by LAA cells, and a power P1 may be employed for uplink transmission on licensed cells.

In an example, a maximum allowable transmit power when cells of a first type (e.g. licensed cells) are configured and activated may be P1. A maximum allowable transmit power when licensed and cells of a second type (e.g. LAA cells) are configured and activated may be P2. In an example, a power P>P2−P1 may be employed by cells of a second type, and a power P may be employed by cells of a first type in a way that total power is below P2. Power allocation mechanisms among cells of a first type and cells of a second type may be configured by RRC and may be determined by UE power control mechanisms. In an example, a portion of power budget may be shared by both signals transmitted on one or more cells of a first type and one or more cells of a second type according to certain power priority allocated to different signals and/or cells.

In an example embodiment different power priorities may be assigned to signals of different channels. When a total transmit power exceeds an allowable transmit power, a UE may adjust transmit power of uplink signals according to a power priority. For example, the following power priority may be considered when transmitting signals in parallel:

PRACH>PUCCH>PUSCH with UCI>PUSCH>SRS

In an example embodiment, the power priority of signals transmitted on an LAA cell may depend on whether the signal is transmitted at a beginning of an uplink burst. The first TB and/or SRS transmitted in a beginning of an uplink burst may have a higher power priority compared with some other signals (e.g. PUSCH and/or SRS). The initial transmission may enable a UE access an LAA channel. If a first transmission is dropped, the probability of the UE to access the channel in one or more subsequent LBT opportunity or subframe may decrease.

In an example embodiment, when a UE is power limited, a first SRS signal transmitted on a cell may have a higher power priority than relative to other signals (e.g. PUSCH and/or SRS) of other cells compared with a second SRS transmitted later during the uplink burst. I an example embodiment, when a UE is power limited, a first PUSCH signal transmitted on a cell may have a higher power priority relative to other signals (e.g. PUSCH and/or SRS) of other cells compared with a second PUSCH transmitted later during the uplink burst.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device from a base station, one or more radio resource control (RRC) messages comprising:
      first configuration parameters of a plurality of cells grouped in a plurality of cell groups comprising:
         a first cell group comprising one or more first cells of a first type of radio access technology; and
         a second cell group comprising one or more second cells of a second type of radio access technology that is different from the first type of radio access technology;
      a first power parameter indicating a first maximum total power value allowed for uplink transmission via the first cell group; and
      a second power parameter indicating a second maximum total power value allowed for uplink transmission via the second cell group;
   determining a total transmission power exceeding a first power value, wherein the total transmission power is based on:
      a first power for transmission of one or more first uplink signals via the first cell group, wherein the first power is less than or equal to the first maximum total power value; and
      a second power for transmission of one or more second uplink signals via the second cell group, wherein the second power is less than or equal to the second maximum total power value;
   dropping scheduled transmission of the one or more first uplink signals of the first cell group in response to the first cell group being of the first type of radio access technology so that an updated total transmission power does not exceed the first power value; and
   transmitting, to the base station, at least one of the one or more second uplink signals with the updated total transmission power via the second cell group.

2. The method of claim 1, wherein the first power value is a maximum transmit power of the wireless device.

3. The method of claim 1, wherein determining the total transmission power exceeding the first power value comprises:
   calculating that a sum of the first power and second power exceeds a maximum transmit power of the wireless device.

4. The method of claim 1, wherein:
   the first type of radio access technology operates in a licensed band; and
   the second type of radio access technology operates in an unlicensed band.

5. The method of claim 1, wherein the second type of radio access technology operates according to a release of LTE technology.

6. The method of claim 1, wherein the one or more first uplink signals comprise one or more first sounding reference signals.

7. The method of claim 1, wherein the one or more first uplink signals comprise one or more first physical uplink shared channel signals.

8. The method of claim 1, wherein the first power value depends on whether at least one cell in the first cell group is activated.

9. The method of claim 1, wherein the dropping the scheduled transmission of the one or more first uplink signals of the first cell group is based on at least one uplink channel transmit power priority.

10. The method of claim 1, wherein the one or more RRC messages further comprise a cell power parameter indicating an allowable transmit power for a cell of the plurality of cells.

11. A method comprising:
receiving, by a wireless device from a base station, one or more radio resource control (RRC) messages comprising:
- first configuration parameters of a plurality of cells grouped in a plurality of cell groups comprising:
  - a first cell group comprising one or more first cells of a first type of radio access technology; and
  - a second cell group comprising one or more second cells of a second type of radio access technology that is different from the first radio access technology;
- a first power parameter indicating a first maximum total power value allowed for uplink transmission via the first cell group; and
- a second power parameter indicating a second maximum total power value allowed for uplink transmission via the second cell group;

determining a total transmission power exceeding a first power value, wherein the total transmission power is based on:
- a first power for transmission of one or more first uplink signals via the first cell group, wherein the first power is less than or equal to the first maximum total power value; and
- a second power for transmission of one or more second uplink signals via the second cell group, wherein the second power is less than or equal to the second maximum total power value;

scaling a transmission power of at least one of the one or more first uplink signals of the first cell group in response to the first cell group being of the first type of radio access technology so that an updated total transmission power does not exceed the first power value; and transmitting, to the base station, at least one of:
- the at least one of the one or more first uplink signals via the first cell group; and
- at least one of the one or more second uplink signals via the second cell group.

12. The method of claim 11, wherein the updated total transmission power is based on:
- the first power; and
- a third power based on the second power after the scaling.

13. The method of claim 11, wherein the first power value is a maximum transmit power of the wireless device.

14. The method of claim 11, wherein determining the total transmission power exceeding the first power value comprises:
- calculating that a sum of the first power and second power exceeds a maximum transmit power of the wireless device.

15. The method of claim 11, wherein:
- the first type of radio access technology operates in a licensed band; and
- the second type of radio access technology operates in an unlicensed band.

16. The method of claim 11, wherein the first type of radio access technology operates according to a release of LTE technology.

17. The method of claim 11, wherein the one or more first uplink signals comprise one or more first physical uplink shared channel signals.

18. The method of claim 11, wherein the first power value depends on whether at least one cell in the first cell group is activated.

19. The method of claim 11, wherein the scaling the transmission power of at least one of the one or more first uplink signals of the first cell group is based on a priority order of the at least one uplink signal.

20. The method of claim 11, wherein the one or more RRC messages further comprise a cell power parameter indicating an allowable transmit power for a cell of the plurality of cells.

* * * * *